Patented Apr. 6, 1948

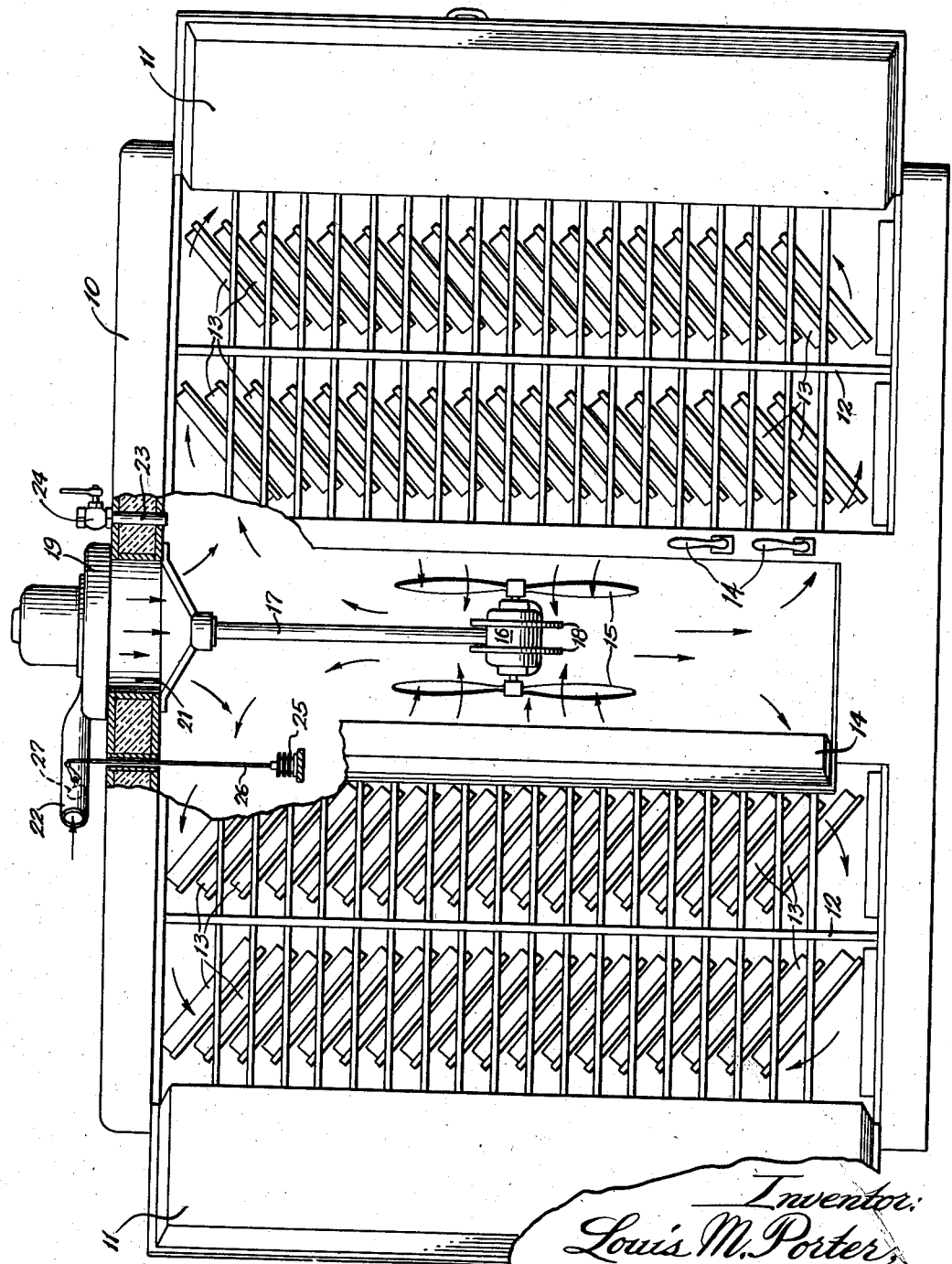

2,439,145

UNITED STATES PATENT OFFICE 2,439,145

INCUBATOR

Louis M. Porter, Englewood, Colo.

Application May 15, 1944, Serial No. 535,601

2 Claims. (Cl. 119—35)

This invention relates to incubators and more particularly to the incubation and/or hatching of the eggs of domestic fowls.

An object of the invention is to provide a compact heating arrangement for an incubator in which the air is heated at a point adjacent the circulating fan.

The above and other objects and advantages of the invention will be more readily apparent from the following description when read in connection with the accompanying drawing, in which the single figure is an open front view with parts broken away and in section of an incubator embodying the invention.

The incubator as shown comprises a cabinet 10 the walls of which are preferably insulated and which has hinged doors 11 providing access to its interior. At the opposite ends of the cabinet, egg tray racks 12 are provided to support a plurality of egg trays indicated at 13. The racks 12 are spaced apart at the center to leave an open space between them which may be closed by a separate door 14 having latching handles 14'.

Air is circulated through the cabinet during incubation by spaced sets of fan blades 15 mounted on the opposite ends of the shaft of a motor 16 which is supported between the racks 12 on a rod 17 extending downwardly from the top of the cabinet. The blades of the fans 15 are so pitched that both sets of blades will draw air in axially from the racks 12 discharging the air over the motor and radially outward to circulate over the egg trays as indicated by the arrows.

The air is heated during circulation by one or more heating units 18 which are circular in shape and are mounted around the motor 16. With this arrangement the air is heated in its passage through the fans before circulating outwardly over the egg trays so that a uniform and efficient heating action is obtained.

In order to maintain the pressure in the cabinet constant and to provide for circulation of fresh air through the cabinet, a second air pump or blower 19 is provided mounted on top of the cabinet and discharging into the cabinet through an opening 21 in the top thereof. The blower draws in atmospheric air through an inlet pipe 22 and air is discharged from the cabinet through a vent pipe 23 having a manually adjustable valve 24 therein.

The pressure in the cabinet is maintained at a substantially constant value by automatic control means responsive to the pressure around or in the interior of the cabinet. The control means as shown, comprises a sealed bellows type pressure responsive switch 25 connected through a rod 26 to a valve 27 in the inlet pipe 22. This switch 25 may be purchased on the open market and has a reciprocable rod (not shown) within pipe 26 for actuating valve 27. It will be understood that the pressure could be controlled equally well by connecting the switch to the valve 24. However, control of the blower inlet is preferred since with this construction, a constant circulation of fresh air through the cabinet can be obtained. The switch 25 is shown as mounted inside the cabinet to be responsive to the pressure therein, which is the preferred arrangement, although satisfactory results could be obtained by mounting the switch outside of the cabinet to compensate for atmospheric pressure changes.

In operation the valve 24 is adjusted to provide the desired amount of fresh air circulation and the switch 25 is selected or adjusted to maintain the desired pressure in the cabinet. Preferably, the cabinet is maintained at approximately 14.7 lbs. per square inch although pressures slightly lower than this will produce satisfactory hatches. In the event that the external pressure changes for any reason as during a thunder storm, or the like, the switch 25 will adjust the valve 27 to maintain the pressure in the cabinet constant. In using the device at high altitudes, the blower 19 will operate to keep the pressure in the cabinet at the selected value approximating atmospheric pressure at sea level. Under these conditions very satisfactory hatches can be obtained at any altitude.

While one embodiment of the invention has been shown and described in detail herein, it will be understood that this is illustrative only and is not intended as a definition of the scope of the invention, reference being had for this purpose to the appended claims.

What is claimed is:

1. An incubator comprising a cabinet, egg supporting means adjacent the opposite ends of the cabinet spaced apart in the central portion of the cabinet, a pair of axially spaced sets of air circulating blades in said central portion of the cabinet, the blades being so pitched that they will draw air in axially from the ends of the cabinet and discharge it outwardly to circulate over the egg supporting means, and air heating means between said sets of blades to heat the air circulated by the blades.

2. An incubator comprising a cabinet, egg supporting means adjacent the opposite ends of the cabinet spaced apart in the central portion of the cabinet, a motor mounted in the central portion of the cabinet on a horizontal axis, sets of fan blades on the opposite ends of the motor shaft, the fan blades being pitched to draw air in axially from the ends of the cabinet, and heating means on the motor to heat air circulated by the fan blades.

LOUIS M. PORTER.

REFERENCES CITED

The following references are of record in the file of this patent:

UNITED STATES PATENTS

| Number | Name | Date |
|---|---|---|
| 1,827,530 | Le Grand | Oct. 13, 1931 |
| 1,911,249 | Stover | May 30, 1933 |
| 1,911,250 | Stover | May 30, 1933 |
| 2,002,057 | Gregg | May 21, 1935 |
| 2,137,996 | Crawford | Nov. 22, 1938 |
| 2,353,201 | Talbot | July 11, 1944 |
| 2,258,054 | Heidbrink | Oct. 7, 1941 |

FOREIGN PATENTS

| Number | Country | Date |
|---|---|---|
| 413,898 | Great Britain | July 26, 1934 |